United States Patent Office 3,267,652
Patented August 23, 1966

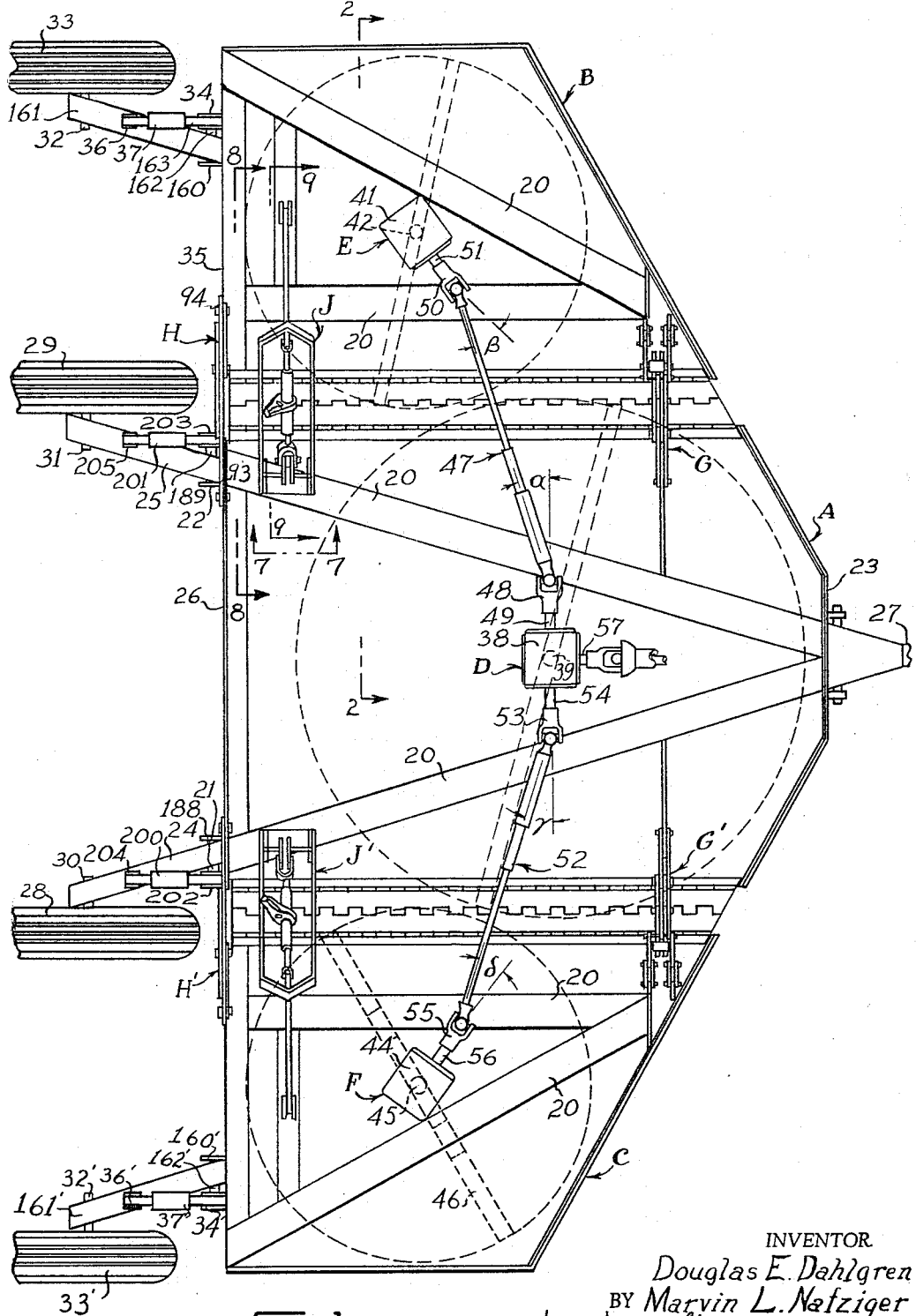

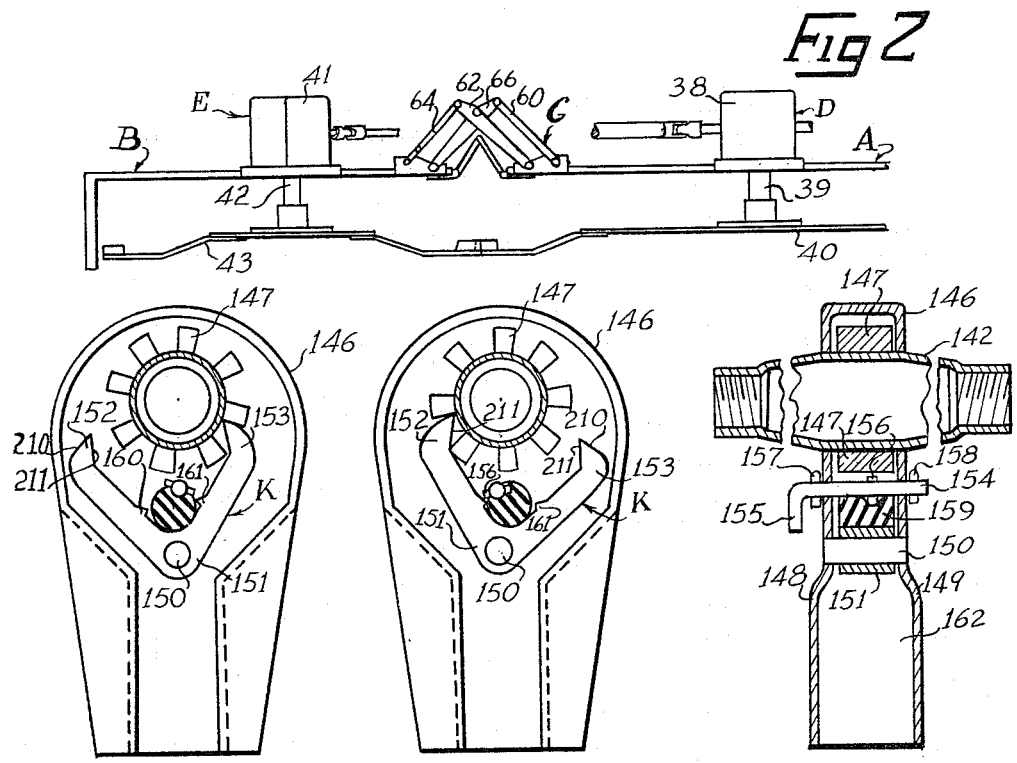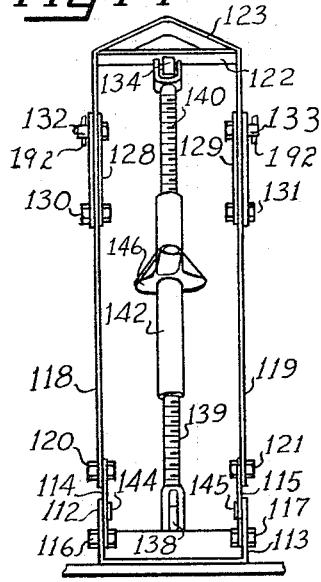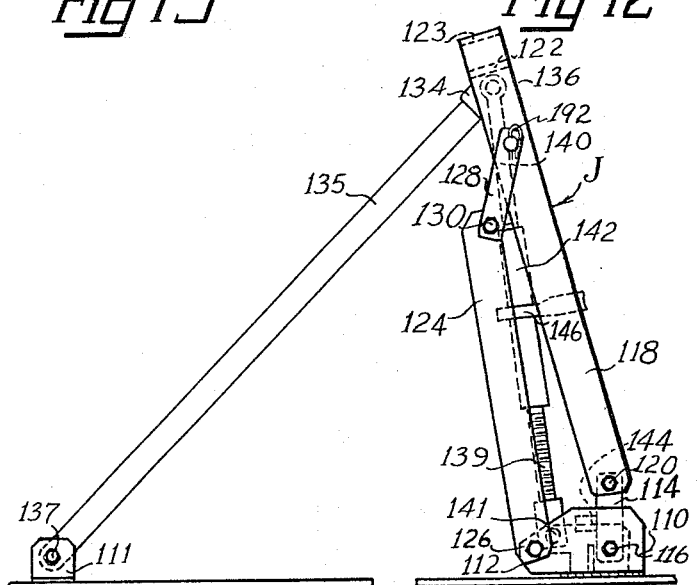

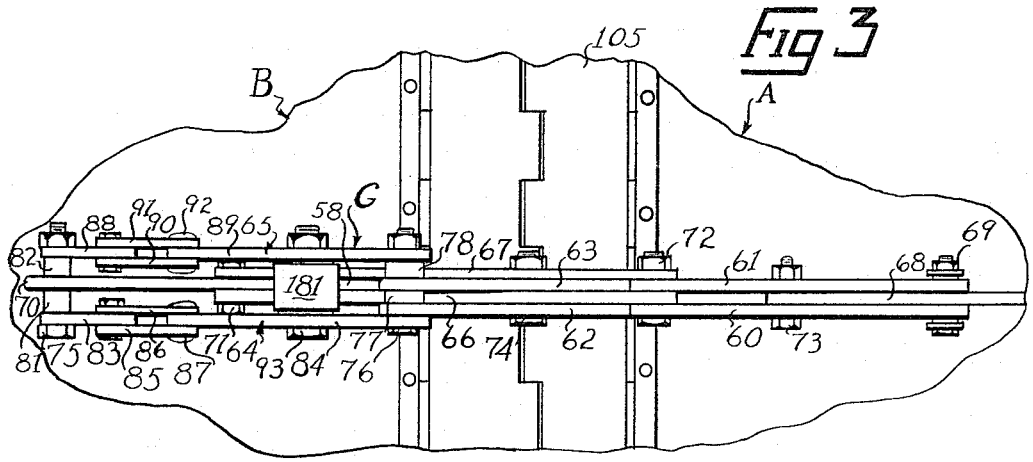
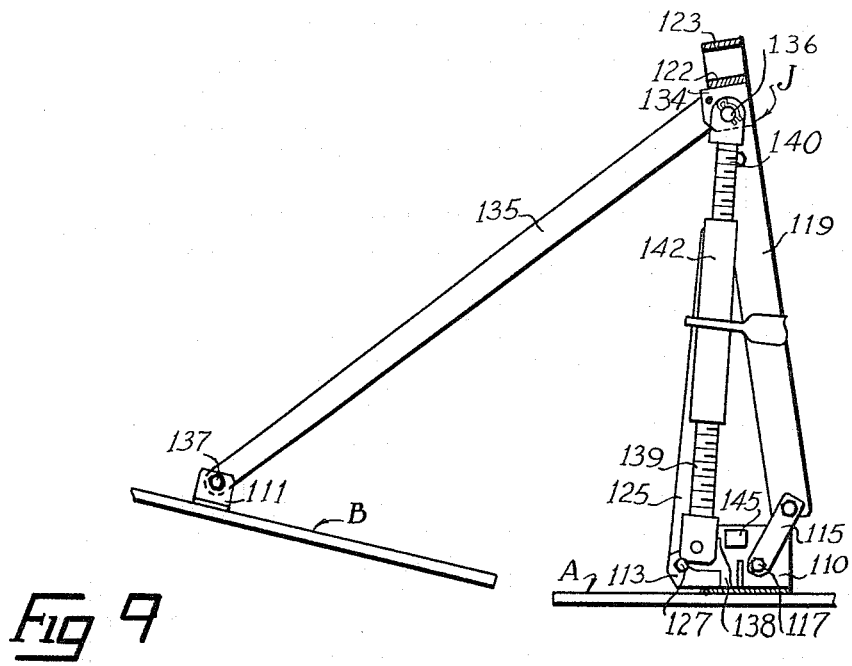

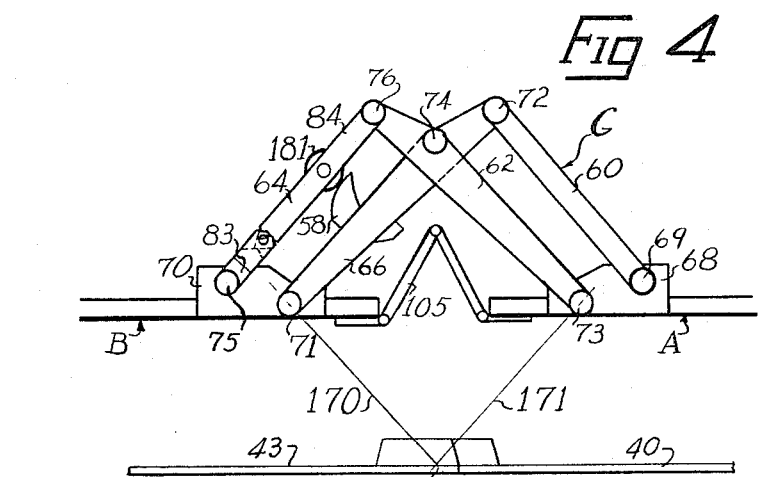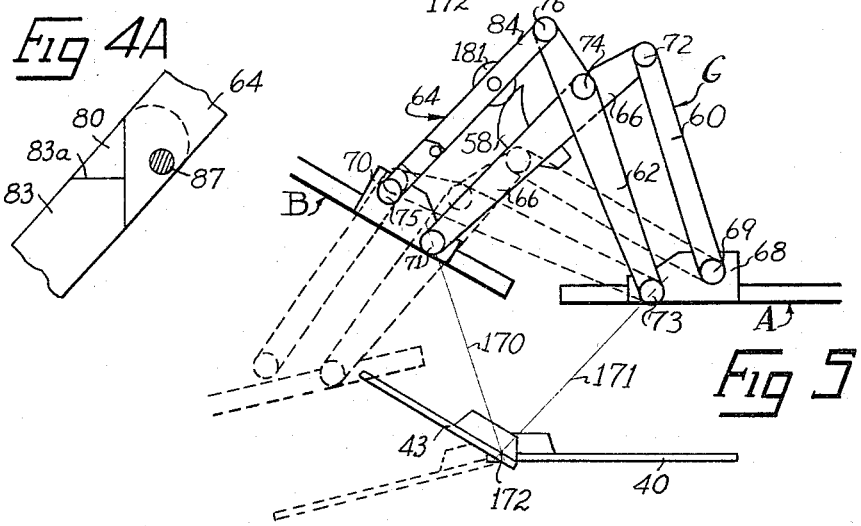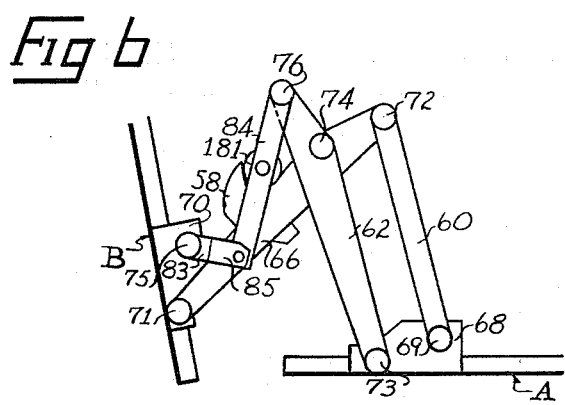

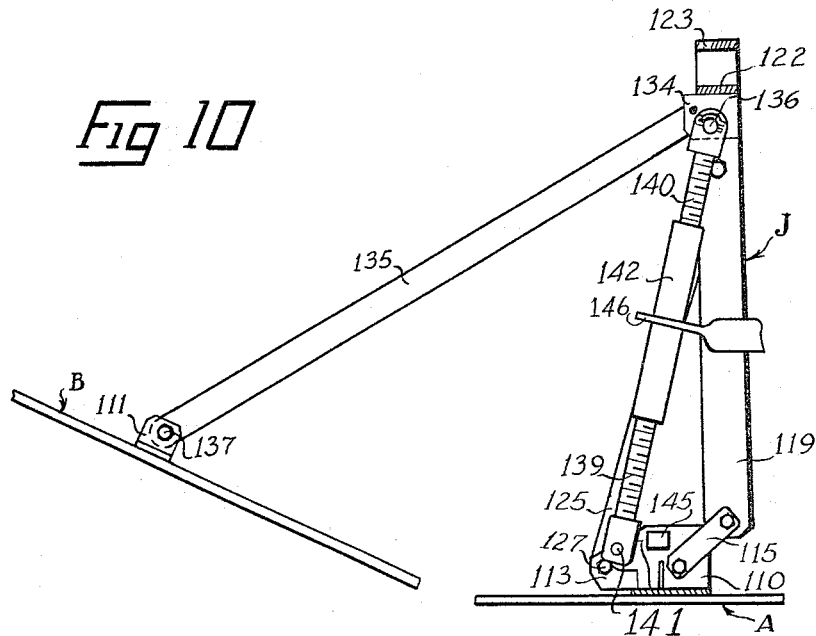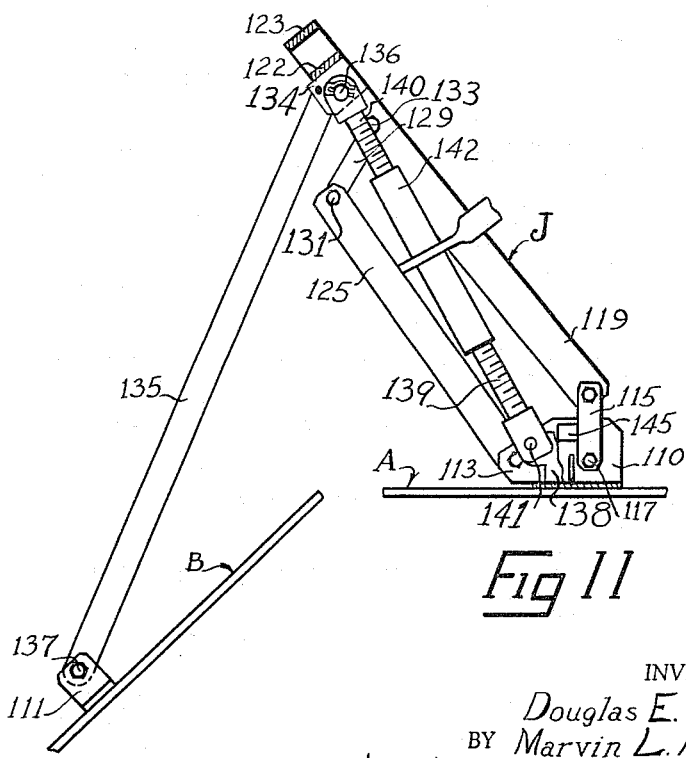

3,267,652
ROTARY CUTTER
Douglas E. Dahlgren and Marvin L. Nafziger, Albany, Ga., assignors to Lilliston Implement Company, Albany, Ga., a corporation of Georgia
Filed Aug. 15, 1963, Ser. No. 302,327
11 Claims. (Cl. 56—6)

This invention relates to rotary cutters and more particularly to a rotary cutter for cutting grasses, crops and other vegetation with a plurality of cutting blades having their cutting planes pivotable with respect to each other.

Rotary cutters used to cut grasses, crops and other vegetation frequently have a plurality of cutting blade assemblies arranged substantially side by side transverse to the direction of travel of the rotary cutter. Thus, the width of the swath cut by the rotary cutter is substantially the sum of the smaller swaths cut by the plurality of the cutting blade assemblies. This permits a rotary cutter to cut a wide swath through a grass, crop or other vegetation without the necessity of using an extemely long cutting blade. A wide swatch is highly desirable because it re- the number of passes required to cut a given area.

However, previous rotary cutters capable of cutting swaths wide enough to be practical have generally been difficult to use on irregular terrain such as rolling, rough or hilly ground. This is because a rotary cutter which cuts a wide swath will straddle an irregularity or will be raised at one side by the irregularity in the terrain so that the cutting blades are not all the same distance above the terrain.

Some previous rotary cutters have attempted to overcome this difficulty by providing for pivotal motion of the plurality of cutting blades. However, with these previous rotary cutters the pivotal motion has been difficult to obtain and has caused lateral translating displacement of the cutting planes of the cutting blades with respect to each other. This lateral displacement of the cutting blades has caused portions of the swath not to be cut. Moreover, with these previous rotary cutters, the pivotal motion of the cutting blades has frequently been limited by a tendency for the cutting blades to strike each other or other portions of the rotary cutter.

The invention described herein completely overcomes these and other difficulties with previous rotary cutters. It comprises a central deck carrying a cutting blade, a left deck carrying a cutting blade and a right deck carrying a cutting blade. The cutting blades of the left and right deck are closely disposed on each side of the cutting blade of the central deck and slightly displaced rearwardly along the line of motion of the device so that while there is no actual overlap of or contact between the blades there is an effective overlap since the trailing blades pass over a small area which was previously cut by the blade of the central deck. Each deck has a cutting plane in which its cutting blade cuts and when the central, left and right decks are in the same flat plane, the cutting planes of the decks all lie in substantially the same flat plane and the trailing blades overlap the path of the blade of the central deck to a degree sufficient to insure that no portions of the swath are not cut.

When it is desired to use the rotary cutter on irregular terrain such as rolling, rough or hilly ground where the surface over which the central deck passes is not in the same plane with the surface over which the right deck or left deck passes, the right deck or left deck may be positioned at an angle with respect to the central deck so as to place the cutting plane of each deck substantially parallel to and the proper distance from the surface over which it is passing. However, the cutting planes of the decks are not laterally displaced from each other by the angular motion of the left deck or right deck with respect to the central deck and the cutting action of the plurality of cutting blade assemblies is continuous across the width of the swath. Regardless of the angular positions of the left and right decks with respect to the central deck, no portions of the swath are missed by the action of the cutting blades and there is no tendency for the cutting blades to engage each other or other portions of the rotary cutter. Moreover, the left and right decks are positionable over a wide range of angular positions with respect to the central deck in order to accomodate wide variations in terrain and are positionable substantially perpendicular to the central deck for road travel of the rotary cutter or other reasons.

The invention provides a uniform and completely cut swath regardless of the character of the terrain over which it is passing by pivoting the cutting planes of the left and right decks with respect to the cutting plane of the central deck about a pivot line in a reference plane containing all of the cutting planes of the decks. Thus, the angular motion of the left and right decks with respect to the central deck is defined by the bending and straightening of a reference plane which always contains the abutting or overlapping cutting planes of all three decks. This pivotal motion of the cutting planes of the decks is easily and conveniently achieved by using linkage mechanisms in combination with a deck positioning mechanism. The linkage mechanisms permit pivotal motion of the cutting planes without lateral displacement when the left and right decks are angularly positioned with respect to the central deck and the deck positioning mechanism has a ratchet operated turnbuckle which provides for the easy and convenient angular positioning of the left or right deck with respect to the central deck. A drive mechanism permits the plurality of cutting blades to be rotated when the left and right decks are horizontal and at various angular positions with respect to the central deck.

These and other features and advantages of the invention will be more clearly understood from the following detailed description and the accompanying drawings in which like characters of reference designate corresponding parts in all figures and in which:

FIG. 1 is a top plan view of the rotary cutter with the central deck, right deck, and left deck all in substantially the same plane.

FIG. 2 is a section view taken in line 2—2 in FIG. 1 showing the manner in which the left deck is joined to the central deck, but with certain details omitted for clarity.

FIG. 3 is a top plan view of a linkage mechanism and of those portions of the left deck and the central deck on which it is mounted.

FIG. 4 is an elevation view showing the front linkage mechanism when the central deck and the left deck are in substantially the same plane.

FIG. 4A is a partial elevational view of the upper left arm of the front linkage mechanism of FIG. 4.

FIG. 5 is an elevation view of the front linkage mechanism showing in solid outline the left deck angularly positioned upward with respect to the central deck and in dashed outline the "left" deck angularly positioned downward with respect to the central deck.

FIG. 6 is an elevation view showing the front linkage mechanism when the left deck is positioned upward and substantially perpendicular to the central deck.

FIG. 7 is an elevation view showing the left deck positioning mechanism as seen in line 7—7 in FIG. 1.

FIG. 8 is an elevation view of the left deck positioning mechanism as seen in line 8—8 in FIG. 1 when the left deck and the central deck are in the same plane.

FIG. 9 is a section view taken in line 9—9 in FIG. 1 and showing the left deck positioning mechanism of FIG. 8 when the left deck is tilted by an irregularity in the terrain.

FIG. 10 is a section view showing the left deck positioning mechanism of FIG. 9 when the left deck is angularly positioned upward with respect to the central deck.

FIG. 11 is a section view showing the left deck positioning mechanism of FIG. 9 when the left deck is angularly positioned downward with respect to the central deck.

FIG. 12 is a section view of the ratchet operated turnbuckle taken in the center line of the turnbuckle.

FIG. 13 is a section view of the ratchet operated turnbuckle taken in a plane perpendicular to the center line of the turnbuckle and showing the left and right pawls in position for rotation of the turnbuckle in a clockwise direction.

FIG. 14 is a section view of the ratchet operated turnbuckle taken in a plane perpendicular to the center line of the turnbuckle and showing the left and right pawls in position for counterclockwise rotation of the turnbuckle.

These figures and the following detailed description disclose a preferred specific embodiment of the invention but the invention is not limited to the details disclosed since it may be embodied in other equivalent forms.

This invention is best understood as comprising a central deck generally indicated by the letter A, a left deck generally indicated by the letter B and connected to one side of the central deck A, and a right deck generally indicated by the letter C and connected to the opposite side of the central deck A. The three decks A, B, and C are substantially flat plates reinforced against twisting and other deformation by reinforcing straps 20. Legs 24 and 25 are pivotally attached by bolts 188 and 189 to brackets 21 and 22 mounted on the trailing edge 26 of the central deck A. Wheels 28 and 29 are rotatably mounted on axles 30 and 31 extending from the legs 24 and 25 and the segment rods 200 and 201 are pivotally extended between brackets 202 and 203 on the trailing edge 26 of the central deck A and brackets 204 and 205 on the legs 24 and 25. The middle segments of rods 200 and 201 are turnbuckles of known type and the adjustable lengths of the rods 200 and 201 determine the pivotal positions of the wheels 28 and 29 with respect to the central deck A. A draw hitch 27 is pivotally attached to the leading edge 23 of the central deck A and this arrangement permits the central deck A to be drawn behind a tractor supported between the wheels 28 and 29 and the draw hitch 27.

Each deck A, B, and C carries a cutting blade assembly generally indicated by the letters D, E, and F. The cutting blade assembly D comprises a gear housing 38 fixedly mounted on the upper surface of the central deck A, a drive shaft 39 extending from the gear housing 38 through the central deck A, and a cutting blade 40 attached to the lower end of the drive shaft 39 for rotation in a cutting plane parallel to and below the central deck A. Similarly, the cutting blade assembly E comprises a gear housing 41 fixedly mounted on the upper surface of the left deck B, a drive shaft 42 extending from the gear housing 41 through the left deck B, and a cutting blade 43 attached to the lower end of the drive shaft 42 for rotation in a cutting plane parallel to and below the left deck B and the cutting blade assembly F comprises a gear housing 44 fixedly mounted on the upper surface of the right deck C, a drive shaft 45 extending from the gear housing 44 through the right deck C, and a cutting blade 46 attached to the lower end of the drive shaft 45 for rotation in a cutting plane parallel to and below the right deck C.

The gear housing 38 is joined to the gear housing 41 by a connector shaft 47 extending between a universal joint 48 at the end of a gear shaft 49 extending from the gear housing 38 and a universal joint 50 at the end of a gear shaft 51 extending from the gear housing 41. Similarly, the gear housing 38 is joined to the gear housing 44 by a connector shaft 52 extending between a universal joint 53 at the end of a gear shaft 54 extending from the gear housing 38 and a universal joint 55 at the end of a gear shaft 56 extending from the gear housing 44.

The centerline of the draw hitch 27 and the centerline of the drive shaft 39 are both in a first vertical plane of reference the centerline of the drive shafts 42 and 45 are both in a second vertical plane of reference perpendicular to the first vertical plane of reference but more remote from the draw hitch 27 than the drive shaft 39. The blades 43 and 46 are the same size while the blade 40 is larger. Since the blades 43 and 46 are offset laterally behind the blade 40 it can be seen that when the blades are in the same plane a distance between the drive shafts 42 and 45 is slightly less than the length of the larger blade 40 plus one-half of each of the lengths of the smaller blades 43 and 46. However, the distances between the drive shafts 39 and 42 and between the drive shafts 39 and 45 are slightly greater than the length of a cutting blade 40, 43 or 46.

This positioning of the drive shafts 39, 42 and 45 results in the cutting planes of the cutting blades 40 and 43 being closely disposed with respect to each other and the cutting planes of the cutting blades 40 and 46 being similarly closely disposed with respect to each other and in the swaths cut by the cutting planes of the cutting blades 43 and 46 overlapping the swath cut by the cutting plane of the cutting blade 40. The gear housings 38, 41 and 44 from which the drive shafts 39, 42, and 45 extend are fixedly positioned on the decks A, B and C in those rotational positions which result, when the decks A, B and C are in the same horizontal plane of reference, in the angle α between the centerline of the gear shaft 49 and the centerline of the connector shaft 47 being equal to the angle β between the centerline of the gear shaft 51 and the centerline of the connector shaft 47 and in the angle γ between the centerline of the gear shaft 54 and the centerline of the connector shaft 52 being equal to the angle δ between the centerline of the gear shaft 56 and the centerline of the connector shaft 52.

The connector shafts 47 and 52 are three segment shafts constructed in known manner so that the segments will slide but not rotate with respect to each other. In addition, the universal joints 48, 50, 53 and 55 and the gears (not shown) within the gear housings 38, 41 and 44 are of known type and with the connector shafts 47 and 52 are arranged so that rotation of a third gear shaft 57 extending from the gear housing 38 by any suitable and known power means (not shown) will simultaneously rotate the cutting blades 40, 43 and 46.

The slidable motion of the segments of the connector shafts 47 and 52 insures the rotation of the cutting blades 40, 43 and 46 regardless of the angular positions of the left deck B and right deck C with respect to the control deck A. When the decks A, B and C are not angularly positioned with respect to each others, the angles α, β, γ and δ selected eliminated in known manner the torques which would develop in the connector shafts 47 and 52 if the angle α was not equal to the angle β and the angle γ was not equal to the angle δ.

The left deck B and right deck C are connected to opposite sides of the central deck A. The left deck B and the right deck C are substantially mirror images of each other and the manner in which the left deck B and the right deck C are supported and positioned with respect to the central deck A is substantially identical. Accordingly, in the detailed description to follow only the left deck B and the manner in which the left deck B is supported and positioned with respect to the central deck A will be described. However, it will be understood that the description is applicable to the right deck C and in order to assist in this understanding the primes of the reference numbers used with respect to the left deck B have been used in the figures for corresponding parts of the right deck C.

The left deck B has a bracket 160 mounted on its trailing edge 35 to which one end of a rod 161 is pivotally attached by extending a bolt 162 through the bracket 160 and the rod 161. The other end of the rod 161 carries an axle 32 on which a wheel 33 is rotatably mounted. A bracket 34 is fixedly attached to a trailing edge 35 of the left deck B adjacent to the bracket 160 and a bracket 36 is fixedly mounted on the rod 161 near the axle 32.

A two-segment link 163 having a turnbuckle 37 of known type joining its segments extends between the bracket 34 and the bracket 36 and rotation of the turnbuckle 37 shortens and lengthens the link 163 in known manner. The shortening and lengthening of the link 163 pivots the rod 161 about the bolt 162 to raise and lower the wheel 33 with respect to the left deck B and for any given length of the rod 161, the wheel 33 is fixedly positioned with respect to the left deck B.

The left deck B is connected to the central deck A by a front linkage mechanism generally indicated by the letter G and a rear linkage mechanism generally indicated by the letter H. The front linkage mechanism G joins the left deck B to the central deck A near the leading edge 23 of the central deck A and the rear linkage mechanism H joins the left deck B to the central deck A near the trailing edge 26 of the central deck A. The front linkage mechanism G and the rear linkage mechanism H are substantially identical with the exception that the front linkage mechanism G is of heavier construction than the rear linkage mechanism H since the front linkage mechanism G must withstand the impact of the left deck B striking objects such as trees and posts. Accordingly, only the front linkage mechanism G will be described in detail, but it will be understood that the rear linkage mechanism H is substantially identical to it in construction.

The front linkage mechanism G comprises a pair of upper central arms 60 and 61, a pair of lower central arms 62 and 63, a pair of upper left arms 64 and 65, and a pair of lower left arms 66 and 67. A rectangular tab 68 is fixedly attached to the central deck A and extends perpendicular to the central deck A. One end of the upper central arm 60 and one end of the upper central arm 61 are pivotably attached to the rectangular tab 68 by placing the upper central arms 60 and 61 on opposite sides of the rectangular tab 68 and by extending a bolt 69 through the upper central arm 60, the rectangular tab 68 and the upper central arm 61. The upper central arms 60 and 61 are of equal length and will pivot together about the bolt 69.

The left deck B has a tab 70 fixedly attached to it and extending perpendicular to the left deck B. One end of the lower left arm 66 and one end of the lower left arm 67 are attached to the tab 70 by placing the lower left arms 66 and 67 on opposite sides of the tab 70 and extending a bolt 71 through the lower left arm 66, the tab 70 and the lower left arm 67. The lower left arms 66 and 67 are of equal length and will pivot together about the bolt 71.

The extending ends of the upper central arms 60 and 61 and of the lower left arms 66 and 67 are pivotably joined by placing the lower left arm 66 between the upper central arm 60 and the upper central arm 61, by placing the lower left arm 67 on the opposite side of the upper central arm 61 from the lower left arm 66, and by extending a bolt 72 through the upper central arm 60, the lower left arm 66, the upper central arm 61, and the lower left arm 67.

One end of the lower central arm 62 and one end of the lower central arm 63 are pivotally attached to the rectangular tab 68 by placing the lower central arms 62 and 63 on opposite sides of the tab 68 and extending a bolt 73 through the lower central arm 62, the rectangular tab 68 and the lower central arm 63. The lower central arms 62 and 63 are of equal length and will pivot together about the bolt 73. The lower central arm 63 extends from the rectangular tab 68 substantially parallel to the upper central arms 60 and 61 and between the lower left arms 66 and 67 and the lower central arm 62 extends from the rectangular tab 68 substantially parallel to the upper central arms 60 and 61 and on the opposite side of the lower left arm 66 from the lower central arm 63. The lower central arms 62 and 63 and the lower left arms 66 and 67 are pivotally attached to each other by extending a bolt 74 through the lower central arm 62, the lower left arm 66, the lower central arm 63 and the lower left arm 67.

One end of the upper left arm 64 and one end of the upper left arm 65 are pivotably attached to the tab 70 by placing the upper left arms 64 and 65 on opposite sides of the tab 70 and extending a bolt 75 through the upper left arm 64, the tab 70, and the upper left arm 65. The upper left arms 64 and 65 extend from tab 70 substantially parallel to the lower left arms 66 and 67 and the extending ends of the upper left arms 64 and 65 are pivotally joined to the extending ends of the lower central arms 62 and 63, by placing the lower central arms 62 and 63 between the upper left arms 64 and 65, and by extending a bolt 76 through the upper left arm 64, the lower central arms 62 and 63 and the upper left arm 65.

The lower central arms 62 and 63 are spaced apart by the lower left arm 66 and by a washer 77 placed on the bolt 76 between the lower central arms 62 and 63. The washer 77 is the same thickness as the lower left arm 66 and the rectangular tab 68, and with the lower left arm 66 and the rectangular tab 68 maintains the lower central arms 62 and 63 parallel to each other. A washer 78 is also placed on the bolt 76 on the opposite side on the lower central arm 63 from the washer 77. This washer 78, the washer 77 and the thickness of the lower central arms 62 and 63 space the upper left arms 64 and 65 apart. The spaced apart upper left arms 64 and 65 are maintained parallel to each other by placing a washer 81 on the bolt 75 between the upper left arm 64 and the tab 70 and a washer 82 on the bolt 75 between the tab 70 and the upper left arm 65.

The upper left arm 64 is comprised of a lower segment 83 and an upper segment 84. Two plates 85 and 86 are fixedly attached to opposite sides of the lower segment 83 and are pivotably attached to opposite sides of the upper segment 84 by extending a pin 87 through the plates 85 and 86 and the upper segment 84. As best seen in FIG. 4A the pin 87 is offset from the center line of the upper left arm 64 toward the lower left arm 66 and when the central deck A and the left deck B are in the same plane, the edge 83A of the lower segment 83 between the plates 85 and 86 is below the pin 87 and substantially parallel to the left deck B and the edge of the upper segment 84 between the plates 85 and 86 is substantially perpendicular to the edge of the lower segment 83 and on the opposite side of the pin 87 from the lower left arm 66. This arrangement of the lower segment 83 and the upper segment 84 of the upper left arm 64 between the plates 85 and 86 permits the lower segment 83 and the upper segment 84 to pivot with respect to each other only over a range of approximately ninety degrees and only in a direction which moves the pin 87 toward the lower left arm 66.

The upper left arm 65 comprises a lower segment 88 and an upper segment 89 joined by plates 90 and 91 and a pin 92 in the same manner as the lower segment 83 and upper segment 84 of the upper left arm 64 are joined by the plates 85 and 86 and the pin 87. The axes of the pins 87 and 92 coincide and the motions of the upper left arms 64 and 65 between the bolts 75 and 76 are identical.

Positioned between the upper segment 84 of the upper left arm 64 and the upper segment 89 of the upper left arm 65 is a cam follower 181 rotatably mounted upon a bolt 93 extending between the upper left arms 64 and 65. The cam follower 181 engages a camming plate 58 fixedly positioned between the lower left arms 66 and 67 when the upper segments 84 and 89 of the upper left arms 64 and 65 pivot about the bolt 76 toward the lower left arms 66 and 67. The shape of the camming plate 58 and action of the cam follower 181 and of the camming plate 58 will be understood when the operation of the front linkage mechanism G is described below.

The axes of the bolts 69, 71, 72, 73, 74, 75 and 76 are parallel to each other and the bolts 71, 74, 75 and 76 are positioned so that a line joining the axes of the bolts 71 and 75 is parallel to a line joining the axes of the bolts 74 and 76 and a line joining the axes of the bolts 71 and 74 is parallel to a line joining the axes of the bolts 75 and 76. Similarly, the bolts 69, 72, 73 and 74 are positioned so that a line joining the axes of the bolts 69 and 73 is parallel to a line joining the axes of the bolts 72 and 74 and a line joining the axes of the bolts 73 and 74 is parallel to a line joining the axes of the bolts 69 and 72.

In addition, the distance between the axes of the bolts 71 and 74 and the distance between the axes of the bolts 73 and 74 are selected so that when the central deck A and the left deck B are in the same plane, a first reference line 170 extending from the axis of the bolt 71 parallel to a line joining the axes of the bolts 73 and 74 and a second reference line 171 extending from the axis of the bolt 73 parallel to a line joining the axes of the bolts 71 and 74 will intersect at a reference line 172 shown as a point in FIGURES 4 and 5 and located where the swath cut by the cutting plane of the cutting blade 40 overlaps the swath cut by the cutting plane of the cutting blade 43. The rear linkage mechanism H joins a rectangular tab 93 on the central deck A and a tab 94 on the left deck B and has upper central arms, lower central arms arranged to make the rear linkage mechanism H identical to the front linkage mechanism G in its relationship to the reference line 172.

The arrangement of the front linkage mechanism G and the rear linkage mechanism H not only insures that the swaths cut by the cutting planes of the cutting blades 40 and 43 overlap when the decks A and B are in the same plane, but it also insures that as the left deck B is angularly positioned with respect to the central deck A, the swaths cut by the cutting planes of the cutting blades 40 and 43 will remain overlapping and the cutting planes of the cutting blades 40 and 43 will simply pivot about the reference line 172. Thus, the angular positioning of the left deck B with respect to the central deck A will not cause a gap between the swaths cut by the cutting planes of the cutting blades 40 and 43 and will not cause the cutting blades 40 and 43 to overlap and collide with each other or other portions of the rotary cutter.

The actions of the linkage mechanisms G and H which cause pivotal motion only of the cutting planes of the cutting blades 40 and 43 when the left deck B is placed at various angular positions with respect to the central deck A are best shown by considering only the action of the front linkage mechanism G since its action and the action of the rear linkage mechanism H are identical. The bolts 69, 72, 73 and 74 define the corners of a parallelogram and the bolts 71, 74, 75 and 76 define the corners of a parallelogram. Similarly, the reference lines 170 and 171, a line joining the axes of bolts 71 and 74, and a line joining the axes of the bolts 73 and 74 form a parallelogram. A line joining the axes of the bolts 71 and 74 has a fixed relationship to a line joining the axes of the bolts 72 and 74 regardless of the angular positions of the decks A and B because the bolts 71, 72 and 74 are all inserted through the lower left arms 66 and 67. Since a line joining the axes of the bolts 72 and 74 and a line joining the axes of the bolts 69 and 73 are opposite sides of a parallelogram and always parallel regardless of the angular positions of the decks A and B, the fixed relationship between a line joining the axes of the bolts 71 and 74 and a line joining the axes of the bolts 72 and 74 results in a fixed angular relationship between a line joining the axes of bolts 69 and 73 and a line joining the axes of the bolts 71 and 74.

The reference line 171 and a line joining the axes of the bolts 71 and 74 are opposite sides of a parallelogram. Therefore, the fixed angular relationship between a line joining the axes of the bolts 71 and 74 and a line joining the axes of the bolts 69 and 73 results in a fixed angular relationship between the reference line 171 and a line joining the axes of the bolts 69 and 73 regardless of the angular positions of the decks A and B. The position of a line joining the axes of the bolts 69 and 73 is fixed with respect to the central deck A because the bolts 69 and 73 are inserted through the rectangular tab 68 and the position of one end of the reference line 171 is fixed by the bolt 73. Thus, one end of the reference line 171 and the fixed angular relationship between the reference line 171 and a line joining the axes of the bolts 69 and 73 fix the position of the reference line 171 with respect to the central deck A.

Similarly, a line joining the axes of the bolts 73 and 74 has a fixed relationship to a line joining the axes of the bolts 74 and 76 because the bolts 73, 74 and 76 are all inserted through the lower central arms 62 and 63. Since a line joining the axes of the bolts 74 and 76 and a line joining the axes of the bolts 71 and 75 are opposite sides of a parallelogram and always parallel regardless of the angular positions of the decks A and B, the fixed relationship between a line joining the axes of the bolts 73 and 74 and a line joining the axes of the bolts 74 and 76 results in a fixed angular relationship between a line joining the axes of the bolts 71 and 75 and a line joining the axes of the bolts 73 and 74.

The reference line 170 and a line joining the axes of the bolts 73 and 74 are opposite sides of a parallelogram, therefore, the fixed angular relationship between a line joining the axes of the bolts 73 and 74 and a line joining the axes of the bolts 71 and 75 results in a fixed angular relationship between the reference line 170 and a line joining the axes of the bolts 71 and 75.

The position of a line joining the axes of the bolts 71 and 75 is fixed with respect to the left deck B because the bolts 71 and 75 are inserted through the tab 70 and the position of one end of the reference line 170 is fixed by the bolt 71. Thus, one end of the reference line 170 and the fixed angular relationship between the reference line 170 and a line joining the axes of the bolts 71 and 75 fix the position of the reference line 170 with respect to the left deck B regardless of the angular positions of the decks A and B.

The reference lines 170 and 171 intersect at the reference line 172 and since the reference lines 170 and 171 are sides of a parallelogram, the length of the reference line 170 between the reference line 172 and the axes of the bolt 71 is fixed as the distance between the axes of the bolts 73 and 74 and the length of the reference line 171 between the reference line 172 and the axes of the bolt 73 is fixed as the distance between the axes of the bolts 71 and 74. The fixed length of the reference line 170 and its fixed position with respect to the left deck B fix the position of the reference line 172 and the left deck B with respect to each other and the fixed length of the reference line 171 and its fixed position with respect to the central deck A fix the positions of the reference line 172 and the central deck A with respect to each other.

As a result of this arrangement the decks A and B, although movable with respect to each other, will each remain in a constant relationship around the reference line 172. This linkage allows the decks A and B to rotate relative to each other about the reference line 172, and although the angular relationship between the decks A and B changes they remain at a constant distance from and angular disposition with the reference line 172. Since the cutting plane of the cutting blade 40 moves with the central deck A and the cutting plane of the cutting blade 43 moves with the left deck B, these cutting planes also remain constantly disposed with respect to the reference line 172 regardless of the angular positions of the central deck A and left deck B with respect to each other. The reference line 172 is located where the swath cut by the cutting plane of the cutting blade 40 overlaps the swath cut by the cutting plane of the cutting blade 43 when the decks A and B are in the same plane and when the operation of the front linkage mechanism holds these cutting planes in the same disposition with respect to the reference line 172 regardless of the angular positions of the decks A and B, it insures that the swaths cut by these cutting planes are always overlapping regardless of the angular positions of the decks A and B.

Thus, the identical operation of the front linkage mechanism G and the rear linkage mechanism H permits the left deck B to be placed at various angular positions with respect to the central deck A while the cutting planes of the cutting blades 40 and 43 simply pivot about the reference line 172. This means that the motion of the cutting planes of the cutting blades 40 and 43 as the decks A and B are placed at various angular positions is defined by the bending along the reference line 172 of a reference plane containing these cutting planes and without motion of the cutting planes in the reference plane.

The front linkage mechanism G will not cause the cutting planes of the cutting blades 40 and 43 to simply pivot with respect to each other about the reference line 172 with angular motion of the decks A and B if the bolts 71, 74, 75 and 76 are not the corners of a parallelogram. Thus, the upper left arms 64 and 65 must be parallel to the lower left arms 66 and 67 and the upper segments 84 and 89 and lower segments 83 and 88 must not pivot with respect to each other toward the lower left arms 66 and 67 as the decks A and B angularly move with respect to each other.

When the left deck B is angularly positioned upward or downward with respect to the central deck A at an angle less than perpendicular to the central deck A, the horizontal component of the distance between bolts 73 and 75 is greater than the horizontal component of the distance between the bolts 71 and 73. Thus, the left deck B will tend to pivot about the bolt 71 and the weight of the left deck B supported by the bolt 75 will maintain the upper left arms 64 and 65 straight and parallel to the lower left arms 66 and 67.

The downward positions into which the left deck B can be positioned with the cutting planes of the cutting blades 40 and 43 simply pivoting with respect to each other are limited by the bolt 76 and the cam follower 181 engaging the lower left arms 66 and 67 and preventing the lower left arms 66 and 67 from passing between the upper left arms 64 and 65. The cam plate 58 is shaped so that the cam follower 181 follows it as the upper left arms 64 and 65 and lower left arms 66 and 67 move together for downward angular positions of the left deck less than this limit.

The upward positions into which the left deck B can be positioned with the cutting planes of the cutting blades 40 and 43 simply pivoting with respect to each other are limited by the tendency of the left deck B to pivot about the bolt 71 toward the central deck A when the left deck B is tilted to or beyond that angular position which places the plane of the left deck B perpendicular to the plane of the central deck B. This limiting position is reached only after the bolts 71 and 75 have reversed their relative horizontal positions.

In order to permit the left deck B to be positioned perpendicular to the central deck A for road travel or similar purposes without this degree of front linkage mechanism G motion, the cam plate 58 is shaped to permit the cam follower 181 and the pins 87 and 92 to move toward the lower left arms 66 and 67 before the axes of the bolts 71 and 75 are in a line perpendicular to the central deck A. This arrangement of the cam plate 58 does not result in the cutting planes of the cutting blades 40 and 43 being laterally displaced with respect to the reference line 172 because until the axes of the bolts are in a line perpendicular to a horizontal plane the weight of the left deck B still maintains the upper left arms 64 and 65 straight and parallel to the lower left arms 66 and 67.

However, it does permit the upper central arms 60 and 61, the lower central arms 62 and 63, and the lower left arms 66 and 67 to remain stationary while the left deck B is positioned for travel or similar purposes by pivoting it with the bolt 75 about the bolt 71 as the lower segments 83 and 88 and the upper segments 84 and 90 pivot about the pins 87 and 92. Although this motion of the lower segments 83 and 88 and upper segments 84 and 89 causes the reference line 170 to move with respect to the left deck B and causes lateral motion of the cutting plane of the cutting blades 43 with respect to the reference line 172, it permits the left deck B to be placed in a perpendicular position with significantly less motion than would be necessary if the upper left arms 64 and 65 remained straight. The cam follower 181 not only permits this motion, but its shape tends to hold the left deck B perpendicular.

Thus, the front linkage mechanism G permits the left deck B to be placed in a wide range of angular positions with respect to the central deck A with the cutting planes of the cutting blades 40 and 43 simply pivoting and permits the left deck B to be moved from the upper limit of this range to a perpendicular position with a minimum of motion. The cam follower 181 and camming plate 58 cooperate to permit this operation of the front linkage mechanism and within this range of angular positions of the left deck B, the cam follower 181 and camming plate 58 cooperate to prevent upward motion of the central deck A resulting from the wheel 33 passing over an irregularity in the terrain from causing the pins 87 and 92 to move toward the lower left arm. This is because motion of the pins 87 and 92 toward the lower left arms 66 and 67 is checked by the cam follower 181 engaging the camming plate 58.

The outer edge of the central deck A and the inner edge of the left deck B are joined by a hinge cover 105. This hinge cover 105 carries no weight and simply joins the central deck A to the left deck B so as to prevent grasses, crops or other vegetation being cut by the rotary cutter from passing through the gap between the central deck A and the left deck B.

Pivotal motion is imparted to the left deck B with respect to the central deck A by the deck pivoting mechanism generally indicated by the letter J. The deck pivoting mechanism J joints an inner bracket 110 fixedly attached to the central deck A adjacent to the trailing edge 26 of the central deck A and an outer bracket 111 fixedly attached to the left deck B adjacent to the trailing edge 35 of the left deck B. The inner bracket 110 has tabs 112 and 113 extending parallel to each other perpendicular to the central deck A. A lower link 114 is pivotally attached to the tab 112 by extending a bolt 116 through the tab 112 and the lower link 114 and a lower link 115 is pivotally attached to the tab 113 by extending a bolt 117 through the tab 113 and the lower link 115. An extension arm 118 is pivotally attached to the extending end of the lower link 114 by extending a bolt 120 through the extension arm 118 and the lower link 114 and an extension arm 119 is pivotally attached to the extending end of the lower link 115 by extending a bolt 121 through the extension arm 119 and the lower link 115.

The extending ends of the extension arms 118 and 119 are joined by a cross member 122 and reinforcing member 123. The cross member 122 is substantially parallel to a line containing the center lines of the bolts 116 and 117 and with the inner bracket 110, the links 114 and 115, and extension arms 118 and 119 forms a rectangle. The reinforcing member 123 is angular with respect to the cross member 122 and serves to aid the cross member 122 in maintaining the links 118 and 119 parallel to each other.

One end of a lever arm 124 is pivotally attached to tab 112 nearer to the outer bracket 111 than the bolt 116 by extending a bolt 126 through the lever arm 124 and the tab 112 and one end of a second lever arm 125 is pivotally attached to the tab 113 nearer to the outer bracket 111 than the bolt 117 by extending a bolt 127 through the lever arm 125 and the tab 113. The extending end of the lever arm 124 is joined to the extension arm 118 by an upper link 128 pivotally attached to the extending end of the lever arm 124 by inserting a bolt 130 through the lever arm 124 and the upper link 128 and to the extension arm 118 below the cross member 122 by inserting a bolt 132 through the upper link 128 and the extension arm 118. Similarly, the extending end of the lever arm 125 is joined to the extension arm 119 by an upper link 129 pivotally attached to the extending end of the lever arm 125 by inserting a bolt 131 through the upper link 129 and the lever arm 125 and to the extension arm 119 below the cross member 122 by inserting a bolt 133 through the extension arm 119 and the upper link 129.

A bracket 134 is fixedly attached to the cross member 122 midway between the extension arms 118 and 119 and a positioning rod 135 extends between the bracket 134 and the outer bracket 111. One end of the positioning rod 135 is forked and pivotally attached to the bracket 134 by extending a bolt 136 through the bracket 134 and the positioning rod 135 and the other end of the positioning rod 135 is pivotally attached to the outer bracket 111 by extending a bolt 137 through the outer bracket 111 and the positioning rod 135.

An ear 138 is fixedly attached to the inner bracket 110 between the tabs 112 and 113 and the forked end of a lower screw 139 is pivotally attached to the ear 138 by extending a bolt 141 through the forked end of the lower screw 139 and the ear 138. The forked end of an upper screw 140 is pivotally attached to the bracket 134 by inserting the bolt 136 through the forked end of the upper screw 140 as well as through the bracket 134 and the positioning rod 135.

The lower screw 139 and the upper screw 140 extend into opposite ends of a turnbuckle 142 which, when rotated in a given direction, draws the lower screw 139 and the upper screw 140 toward each other and when rotated in the opposite direction forces the lower screw 139 and the upper screw 140 away from each other. Thus, turnbuckle 142 operates in a known manner to shorten or lengthen the distance between the bolt 136 and the bolt 141.

A stop 144 is fixedly positioned on the tab 112 and will be engaged by the lower link 114 when the lower link 114 is in a position substantially perpendicular to the central deck A. Similarly, a stop 145 is fixedly positioned on the tab 113 and is engaged by the lower link 115 when the lower link 115 is in a position substantially perpendicular to the central deck A. Thus, the stops 144 and 145 restrict pivotal motion of the lower links 114 and 115 toward the outer bracket 111 and pivotal motion of the lower links 114 and 115 about the bolts 116 and 117 is limited to pivoting to and from that position in which they are checked by the central deck A and that position in which they engage the stops 144 and 145.

When the left deck B and central deck A are in the same plane, the extension arms 118 and 119, the lever arms 124 and 125, and the screws 139 and 140 are inclined toward the left deck B and the rod 135 extends between the bolt 136 and the bolt 137 as shown in FIGURE 8. The distance between the bolts 136 and 141 is fixed by the screws 139 and 140 and the turnbuckle 142, and the bolt 136 will not pivot about the bolt 141 toward the left deck B because this motion is restricted by the extension arms 118 and 119 which in turn are restricted by the lower links 114 and 115 engaging the stops 144 and 145. Thus, the left deck B is supported by the linkage mechanisms G and H and the positioning rod 135 and cannot tilt downward with respect to the central deck A.

However, the position of the wheel 33 with respect to the left deck B is fixed by the rotational position of the turnbuckle 37, and when the wheel 33 engages an irregularity in the terrain over which the rotary cutter is passing, the left deck B will tend to be tilted into an angular position with respect to the central deck A. The deck pivoting mechanism J permits this angular motion of the left deck B with respect to the central deck A because pivotal motion of the bolt 136 toward the central deck A will move the lower links 114 and 115 away from the stops 144 and 145. The extension arms 118 and 119 and the lower links 114 and 115, and the lever arms 124 and 125 and the upper links 128 and 129 will pivot with respect to each other so as to permit the necessary pivotal motion of the screws 139 and 140 about the bolt 141 toward the central deck A. This is most clearly shown by comparing the positions of these components of the deck pivoting mechanism as shown in FIG. 8 with their positions as shown in FIG. 9. Thus, the deck pivoting mechanism J positions the left deck B with respect to the central deck A in a general position out of which the left deck B will not tilt downward while at the same time permitting the left deck B to tilt upward with respect to the central deck A when the wheel 33 engages an irregularity in the terrain over which the rotary cutter is passing.

When it is desired to generally position the left deck B at an angle to the central deck A, it is simply necessary to change the distance between the bolts 136 and 141. Increasing the distance between the bolts 136 and 141 places the deck positioning mechanism J in a configuration similar to that shown in FIGURE 10 and tilts the left deck B upward with respect to the central deck A. In moving from the configuration of FIGURE 8 to the configuration of FIGURE 10, the increasing of the distance between bolts 136 and 141 moves the lower screw 139 and upper screw 140 into a position perpendicular to the control deck A.

In this position of the deck positioning mechanism J between that shown in FIGURE 8 and that shown in FIGURE 10, the extension arms 118 and 119 are still inclined toward the left deck B and the lower links 114 and 115 still engage the stops 144 and 145. Thus, the left deck B is tilted upward and will not tilt downward for the same reason that it will not tilt downward when it is positioned in the same plane with the central deck A by the deck positioning mechanism J. The left deck B also responds to an irregularity in the terrain over which it is passing with the same upward motion whether it is in this angular position or in the same plane with the central deck A.

When the distance between the bolts 136 and 141 is further increased, the lower screw 139 and upper screw 140 pass beyond that position perpendicular to the central deck A and are inclined away from the left deck B. As this occurs, the lever arms 124 and 125 and upper links 128 and 129 become aligned and limit the motion of the bolts 131 and 132 with respect to the bolts 126 and 127. This occurs before the extension arms 118 and 119 are perpendicular to the central deck A and the result is that as the distance between the bolts 136 and 141 increases further, the lower links 114 and 115 pivot away from the stops 144 and 145 and the extension arms 118 and 119 move downward as shown in FIGURE 10. The motion of the bolt 136 as the deck positioning mechanism J moves into the configuration of FIGURE 10 further tilts the left deck B with respect to the central deck A.

The upward angular position of the left deck B with respect to the central deck A is increased beyond that of FIGURE 10 by further increasing the distance between the bolts 136 and 141. This causes the continuing downward pivoting of the lower links 114 and 115 until they strike the central deck A to limit further tilting of the left deck B with respect to the central deck A. The lower links 114 and 115 will strike the central deck A before the left deck B is perpendicular to the plane of the central deck A within the range of front linkage mechanism G and rear linkage mechanism H motion which causes the cutting planes of the cutting blades 40 and 43 to simply pivot with respect to each other.

Downward motion of the left deck B from this maximum position and from those positions between it and that in which the lower links 114 and 115 start to move away from the stops 144 and 145 is prevented by the restriction which the aligned lever arms 124 and 125 and upper links 128 and 129 place on motion of the bolt 136 away from the central deck A and toward the left deck B. The upward motion of the left deck B in response to the wheel 33 striking an irregularity in the terrain is permitted by a motion of the lower links 114 and 115 and extension arms 118 and 119 similar to that when the angular position of the left deck B is increased and is prevented only when the angular position of the left deck B is so great that the lower links 114 and 115 are striking the central deck A.

When it is desired to position the left deck B in that perpendicular position permitted by the pivoting of the lower segments 83 and 88 and upper segments 84 and 89 of the upper left arms 64 and 65 with respect to each other, it is simply necessary to remove the upper links 128 and 129 from the bolts 132 and 133 so that motion of the extension arms 118 and 119 is limited only by the bolts 120 and 121. This permits the distance between the bolts 136 and 141 to be increased and the extension arms 118 and 119 to pivot toward the central deck A to the extent necessary to position the left deck B perpendicular to the central deck A. The positioning of the left deck B in a perpendicular position in this manner is facilitated by using easily removed cotter pins 192 of known type to hold the upper links 128 and 129 to the bolts 131 and 132.

Making the distance between the bolts 136 and 141 less than that distance between these bolts 136 and 141 when the left deck B is in the same plane with the central deck A positions the left deck B at a downward angular position with respect to the central deck A. The configuration of the deck positioning mechanism J when the left deck B is tilted downward is shown in FIGURE 11. This configuration of the deck positioning mechanism J is substantially the same as its configuration when the left deck B is in the same plane with the central deck A.

When the deck positioning mechanism is in or between the configurations of FIGURES 8 and 11, downward motion of the left deck B beyond that permitted by the selected distance between bolts 136 and 141 is prevented by the lower links 114 and 115 engaging the stops 144 and 145 and upward movement of the left deck B in response to the wheel 33 striking an irregularity in the terrain is permitted by the lower links 114 and 115 moving away from the stops 144 and 145. Thus, the deck positioning mechanism J in cooperation with the linkage mechanisms G and H permits the left deck B to be positioned at a wide variety of angular positions with respect to the central deck A and with the cutting planes of the cutting blades 40 and 43 only pivoting with respect to each other. The deck positioning mechanism J also provides for the positioning of the left deck B perpendicular to the central deck A as permitted by the linkage mechanisms G and H. The position of the left deck B is simply dependent upon the distance between the bolts 136 and 141.

The distance between the bolts 136 and 141 is easily and conveniently adjusted by providing for ratcheted motion of the turnbuckle 142. A plurality of ratchet teeth 147 are equally distributed about the circumference of turnbuckle 142. The ratchet teeth 147 are enclosed within a ratchet housing 146 which is freely rotatable about the turnbuckle 142 and the ratchet teeth 147. The ratchet housing 146 is substantially concentric with the turnbuckle 142 and the extending ratchet teeth 147 for the greater portion of the circumference of the turnbuckle 142. However, one side of the housing 146 extends away from the center line of the turnbuckle 142 to provide two parallel plates 148 and 149 substantially perpendicular to the center line of the turnbuckle 142.

A pin 150 extends between the plates 148 and 149 with its center line parallel to the center line of the turnbuckle 142 and the midportion 151 of a pawl member generally indicated by the letter K is pivotally mounted on the pin 150 between the plates 148 and 149. A left pawl 152 extends within the ratchet housing 146 from the midportion 151 of the pawl member K to the left of the turnbuckle 142 and a right pawl 153 extends within the ratchet housing 146 from the midportion 151 of the pawl member K to the right of the turnbuckle 142 as viewed in FIGS. 13 and 14. The distance between the extending ends of the left pawl 152 and the right pawl 153 and the size of the ratchet housing 146 are selected so that when either the left pawl 152 or the right pawl 153 is engaging one of the plurality of ratchet teeth 147, the other pawl 152 or 153 is well clear of the ratchet teeth 147. Thus, pivotal motion of the left pawl 152 and the right pawl 153 within the ratchet housing 146 and about the pin 150 causes either the left pawl 152 or the right pawl 153 to engage the ratchet teeth 147.

A selector pin 154 extends between and through the plates 148 and 149. The centerline of the selector pin 154 is parallel to the centerline of the turnbuckle 142 and between the pin 150 and the turnbuckle 142 in the same plane of reference with the centerlines of the pin 150 and the turnbuckle 142. The selector pin 154 is freely rotatable and positioned in the ratchet housing 146 by inserting cotter pins 157 and 158 through its extending ends. One extending end of the selector pin 154 is formed into a handle 155 which permits the selector pin 154 to be easily rotated about its centerline.

Fixedly attached to the selector pin 154 within the ratchet housing 146 is a compressor bar 156. The centerline of the compressor bar 156 is perpendicular to the centerline of the selector pin 154 and the compressor bar 156 is bisected by the selector pin 154. A cylindrical plug 159 of material such as rubber is positioned within the ratchet housing 146 between the compressor bar 156 and the midportion 151 of the pawl member K. The left pawl 152 has a tab 160 extending from it toward the plug 159 and the right pawl 153 has a tab 161 extending from it toward the plug 159.

The diameter of the plug 159 is selected so that when the compressor bar is perpendicular to a line extending between the centerlines of the turnbuckle 142 and pin 150, the plug 159 is compressed between the compressor bar 156 and the midportion 151 of the pawl member K. The resiliency of the plug 159 in this compressed condition causes the compressor bar 156 to pivot downward toward either the left pawl 152 or right pawl 153 and the pawl member K to pivot about the pin 150 so as to place the left pawl 152 or right pawl 153 substantially parallel to the compressor bar 156. With the compressor bar 156 substantially parallel to either the left pawl 152 or right pawl 153, the compression of the plug 159 between the compressor bar 156 and the pawl member K is at a minimum. However, the plug 159 is still in compression and is urging the compressor bar 156 and that pawl 152 or 153 substantially parallel to the compressor bar 156 apart. This results in the other pawl 152 or 153 being urged toward the ratchet teeth 147.

The plug 159 remains in a position urging one pawl 152 or 153 away from the ratchet teeth 147 and the other pawl 152 or 153 toward the ratchet teeth 147 because any other position of the pawl member K, the compressor bar 156, and the plug 159 with respect to each other will increase the compression of the plug 159. However, there are two positions of the compressor bar 156 in which the compression of the plug 159 is at a minimum.

In one position the compressor bar 156 and the right pawl 153 are substantially parallel and the left pawl 152 is being urged toward the ratchet teeth 147 and in the other position, the compressor bar 156 and the left pawl 152 are substantially parallel and the right pawl 153 is being urged toward the ratchet teeth 147. The compressor bar 156 will not freely move from one position to the other because the change from one position to the other requires the compression of the plug 159 to be increased. The compressor bar 156 is moved from one position of minimum compression of plug 159 to another by rotating the selector pin 154 with the handle 155 in a direction toward that pawl 152 or 153 which is substantially parallel to the compressor bar 156. This rotational motion of the selector pin 154 is most easily understood from FIGURES 13 and 14.

The compressor bar 156 is moved from its position in FIGURE 13 to its position in FIGURE 14 by rotating the selector pin 154 with the handle 155 in a clockwise direction. This rotational motion of the selector pin 154 initially forces the compressor bar 156 into the plug 159 and causes the plug 159 to be compressed and rolled toward the left pawl 152 where it engages the tab 160 and forces the left pawl 152 away from the ratchet teeth 147. As this rotational motion of the compressor bar 156 continues the plug 159 is further compressed between the left pawl 152, the tab 160 and the compressor bar 156. This compression of the plug 159 continues forcing the left pawl 152 away from the ratchet teeth 147 and permits the compressor bar 156 to complete its rotation into the position of FIGURE 14.

The compressor bar 156 is moved from the position of FIGURE 14 to the position of FIGURE 13 by rotating the selector pin 154 in a counterclockwise direction. The resulting rotational motion of the compressor bar 156 initially compresses and rolls the plug 159 toward the right pawl 154 and the tab 161 and forces the right pawl 153 away from the ratchet teeth 147. The continuing rotation of the compressor bar continues the compression of the plug 159 and ends with the compressor bar 156 in the position of FIGURE 13.

The lengths of the left pawl 152 and the right pawl 153 are selected so that when the left pawl 152 or right pawl 153 is urged toward the ratchet teeth 147, the extending end of the pawl 152 or 153 will tend to move between adjoining ratchet teeth 147. The ratchet teeth 147 are substantially rectangular in shape and the extending ends of the pawls 152 and 153 are shaped so that when inserted between adjoining ratchet teeth 147, one edge 210 is substantially parallel to the sides of the ratchet teeth and one edge 211 slopes with respect to sides of the ratchet teeth 147. Motion of a pawl 152 or 153 which forces its parallel edge 210 against a ratchet tooth 147 moves the ratchet tooth 147 and turnbuckle 142 in the direction of pawl 152 or 153 motion. Motion of a pawl 152 or 153 which forces its sloping edge 211 against a ratchet tooth 147 does not move the ratchet tooth 147 because the sloping edge 211 simply slides over the ratchet tooth 147.

When the compressor bar 156 is in the position of minimum plug 159 compression shown in FIGURE 13, this arrangement of the pawls 152 and 153 and the ratchet teeth 147 results in clockwise rotation of the ratchet housing 146 causing the left pawl 152 to engage a ratchet tooth 147 and rotate the turnbuckle 142 in a clockwise direction. Rotation of the ratchet housing 146 in a counterclockwise direction causes the left pawl 152 to simply slide over the ratchet teeth 147 against the pressure exerted by the plug 159 and without rotating the turnbuckle 142. Thus, when the compressor bar 156 is in the position shown in FIGURE 13, the alternate clockwise and counterclockwise rotation of the ratchet housing will result in clockwise rotation of the turnbuckle 142.

Similarly, when the compressor bar 156 is in the position of minimum plug 159 compression shown in FIGURE 14, rotation of the ratchet housing 146 in a counterclockwise direction will cause the right pawl 153 to force the ratchet teeth 147 and the turnbuckle 142 in a counterclockwise direction and rotation of the ratchet housing 142 in a clockwise direction will simply cause the right pawl 153 to slide over the ratchet teeth 147 without imparting motion to the ratchet teeth 147 and the turnbuckle 142. Thus, depending upon the position of the compressor bar 156, alternate clockwise and counterclockwise motion of the ratchet housing 146 will rotate the turnbuckle 142 in a clockwise or counterclockwise direction. This rotation of the turnbuckle 142 will shorten or increase the distance between bolts 136 and 142 in known manner.

Rotation of the ratchet housing 146 about the turnbuckle 142 is facilitated by shaping those portions of the plates 148 and 149 more remote from the turnbuckle 142 than the pin 150 to form a channel 162 extending between the plates 148 and 149 with a centerline perpendicular to the centerline of the turnbuckle 142. Any convenient rod or pole (not shown) can be inserted into this channel 162 and used to rotate the ratchet housing 146 about the turnbuckle 142. If desired, a ratchet housing 146 can be mounted on turnbuckles 37, 37' and the turnbuckle segments of rods 200 and 201.

From the foregoing description of the rotary cutter, it can be seen that the invention is a rotary cutter having means for joining and for selectively positioning a plurality of decks A, B, and C in a manner which permits the cutting planes of a plurality of cutting means carried by the plurality of decks to be pivoted with respect to each other as required by the terrain over which the rotary cutter is passing while at the same time maintaining a uniformly cut swath and permitting motion of the cutting planes in response to irregularities in the terrain. The plurality of decks are easily and conveniently positioned at various angular positions with respect to each by alternate clockwise and counterclockwise motions of a ratchet mechanism and regardless of the angular positions of the decks, the plurality of cutting means carried by the plurality of decks are rotated in a uniform manner.

It will be obvious that many variations may be made in the embodiment here chosen for the purpose of illustrating the present invention without departing from the scope thereof as defined by the appended claims.

What is claimed as invention is:

1. A rotary cutter of the type described, said rotary cutter having a plurality of cutting blades with cutting planes positionable in the same flat plane of reference and having means for pivoting the cutting planes with respect to each other about a line of reference in the reference plane, said means for pivoting being displaced from said line of reference.

2. A rotary cutter of the type described, said rotary cutter having a plurality of means for cutting, each cutting means having a cutting plane in which it cuts, means removed from said cutting planes for pivoting said cutting planes about a line of reference in the cutting plane of another of said plurality of cutting means.

3. A rotary cutter of the type described, said rotary cutter having a plurality of means for cutting, each cutting means being adjacent to another cutting means and having a cutting plane in which it cuts, means remote from said cutting planes for pivoting said cutting means with respect to the cutting plane of the adjacent cutting means about a common line of reference in the cutting planes of the adjacent cutting means.

4. A rotary cutter of the type described comprising, in combination, a plurality of means for cutting, each cutting means having a cutting plane in which it cuts, and means removed from said cutting planes for selectively positioning the plurality of cutting means at various angular positions with respect to each other while restricting the cutting planes of the plurality of cutting means to pivotal motion with respect to each other about a line of reference common to adjacent cutting planes.

5. A rotary cutter of the type described comprising, in combination, a plurality of means for cutting, each cutting means having a cutting plane in which it cuts, and means displaced from said cutting planes for selectively positioning the plurality of cutting means at various angular positions with respect to each other while restricting the cutting planes of the plurality of cutting means to pivotal motion with respect to each other about a line of reference common to adjacent cutting planes, said positioning means providing unidirectional angular motion of the plurality of cutting means from selected angular positions.

6. A rotary cutter of the type described comprising, in combination, a plurality of means for cutting, each cutting means having a cutting plane in which it cuts, and means for selectively positioning the plurality of cutting means at various selected angular positions with respect to each other while restricting the cutting planes of the plurality of cutting means to pivotal motion with respect to each other, said positioning means being arranged to permit unidirectional angular motion of the plurality of cutting means from the angular position selected, and said positioning means being arranged to position the cutting planes of the plurality of cutting means substantially perpendicular to each other with other than pivotal motion with respect to each other.

7. A rotary cutter comprising, in combination; a first deck having a tab fixedly mounted thereon; a second deck having a bracket fixedly mounted thereon; a first arm having a first end pivotally attached to the said tab and a second end; a second arm having a first end pivotally attached to the bracket and a second end pivotally joined to the second end of the first arm; a third arm having a first end pivotally attached to the tab and a second end, said third arm being parallel to the first arm and being pivotally joined between its first end and second end to the second arm between the first end and second end of the said second arm; a fourth arm having a lower segment with a first end pivotally attached to the bracket and a second end, an upper segment with a first end pivotally attached to the second end of the third arm, a plurality of plates fixedly attached to the second end of the first segment and pivotally attached to the second end of the second segment, said second ends of the first and second segments being pivotable from a position in which the first and second segments are parallel to the second arm into a position in which the first and second segments are inclined toward the second arm; a camming plate fixedly attached to the second arm and extending toward the fourth arm; a cam fixedly mounted on the second segment of the fourth arm, said cam and camming plate being arranged to cooperatively prevent pivotal motion of the first and second segments of the fourth arm toward the second arm over a predetermined range of pivotal motion by the second arm with respect to the third arm; the said first, second, third and fourth arms being arranged so that the first arm, second arm and third arm move as sides of a parallelogram when the first arm and third arm pivot with respect to the tab and the second arm, third arm and fourth arm move as sides of a parallelogram when the second arm and fourth arm pivot with respect to the bracket while the cam and camming plate cooperatively prevent pivotal motion of the first and second segments toward the second arm; and means for angularly positioning the first deck with respect to the second deck.

8. In a rotary cutter having a first cutting means with a tab and a second cutting means with a bracket, a linkage mechanism for joining of said first cutting means and said second cutting means comprising, in combination, a first arm having a first end pivotally attached to the said tab and a second end; a second arm having a first end pivotally attached to the bracket and a second end pivotally joined to the second end of the first arm; a third arm having a first end pivotally attached to the tab and a second end, said third arm being parallel to the first arm and being pivotally joined between its first end and second end to the second arm between the first end and second end of the said second arm; a fourth arm having a first end pivotally attached to the bracket and a second end pivotally attached to the second end of the third arm, said fourth arm being parallel to the second arm; the said first, second, third and fourth arms being arranged so that the first arm, second arm and third arm move as sides of a parallelogram when the first arm and third arm pivot with respect to the tab and the second arm, third arm and fourth arm move as sides of a parallelogram when the second arm and fourth arm pivot with respect to the bracket.

9. A rotary cutter comprising, in combination; a first deck having a tab fixedly mounted thereon; a second deck having a bracket fixedly thereon; means for joining the first deck and second deck for angular motion with respect to each other; a first lower link having a first end pivotally attached to the bracket and a second end; a second lower link having a first end pivotally attached to the bracket and a second end; a first extension arm having a first end pivotally attached to the second end of the first lower link and a second end; a second extension arm having a first end pivotally attached to the second end of the second lower link and a second end; a cross member fixedly joining the second end of the first extension arm and the second end of the second extension arm so as to maintain the said extension arms parallel to each other; an upper screw having a first end pivotally attached to the cross member between the first extension arm and the second extension arm and a second end; a lower screw having a first end pivotally attached to the bracket between the first lower link and the second lower link and nearer to the tab than the said lower links and having a second end; a turnbuckle joining the second end of the upper screw and the second end of the lower screw and being arranged to draw said upper screw and lower screw into it with rotation in one direction and to expel said upper screw and lower screw with rotation in the opposite direction; a first lever arm having a first end pivotally attached to the bracket and nearer to the tab than the first end of the lower screw and having a second end and a length; a second lever arm having a first end pivotally attached to the bracket and nearer the tab than the first end of the lower screw and having a second end and a length; a first upper link having a first end pivotally attached to the second end of the first lever arm, a second end pivotally attached to the first extension arm between the cross member and the first lower link, and a length which when added to the length of the first lever arm restricts motion of the first extension arm as the first extension arm approaches a position substantially perpendicular to the second deck; a second upper link having a first end pivotally attached to the second end of the second lever arm, a second end pivotally attached to the second extension arm between the cross member and the second lower link, and a length which when added to the length of the second lever arm restricts motion of the second extension arm as the second extension arm approaches a position substantially perpendicular to the second deck; a first stop fixedly mounted on the bracket so as to be engaged by the first lower link as the first lower link pivots from the second deck toward the first deck; a second stop fixedly mounted on the bracket so as to be engaged by the second lower link as the second lower link pivots from the second deck toward the first deck; and a rod having a first end pivotally attached to the cross member and a second end pivotally attached to the tab.

10. In a rotary cutter of the type described having a first cutting means and a second cutting means, a positioning mechanism comprising, in combination, a first lower link having a first end pivotally attached to the first cutting means and a second end; a second lower link having a first end pivotally attached to the first cutting means and a second end; a first extension arm having a first end pivotally attached to the second end of the first lower link and a second end; a second extension arm having a first end pivotally attached to the second end of the second lower link and a second end; a cross member fixedly joining the second end of the first extension arm and the second end of the second extension arm; an upper screw having a first end pivotally attached to the cross member between the first extension arm and the second extension arm and a second end; a lower screw having a first end pivotally attached to the first cutting means between the first lower link and the second lower link and nearer to the second cutting means than the said lower links and having a second end; a turnbuckle joining the second end of the upper screw and the second end of the lower screw and being arranged to draw said upper screw and lower screw into it with rotation in one direction and to expel said upper screw and lower screw with rotation in the opposite direction; a first lever arm having a first end pivotally attached to the first cutting means and nearer to the second cutting means than the first end of the lower screw and having a second end; a second lever arm having a first end pivotally attached to the first cutting means and nearer the second cutting means than the first end of the lower screw and having a second end; a first upper link having a first end pivotally attached to the second end of the first lever arm and a second end pivotally attached to the first extension arm between the cross member and the first lower link; a second upper link having a first end pivotally attached to the second end of the second lever arm and a second end pivotally attached to the second extension arm between the cross member and the second lower link; a first stop fixedly mounted on the first cutting means so as to be engaged by the first lower link as the first lower link pivots; a second stop fixedly mounted on the first cutting means so as to be engaged by the second lower link as the second lower link pivots; and a rod having a first end pivotally attached to the cross member and a second end pivotally attached to the second cutting means.

11. In a rotary cutter of the type described having a first cutting means and a second cutting means a positioning mechanism comprising, in combination, a lower link having a first end pivotally attached to the first cutting means and a second end; an extension arm having a first end pivotally attached to the second end of the lower link and second end; a lever arm having a first end pivotally attached to the first cutting means and nearer to the second cutting means than the first end of the lower link and having a second end and a length; an upper link having a first end pivotally attached to the second end of the lever arm; a second end pivotally attached to the extension arm between the second end of the extension arm and the lower link, and a length which when added to the length of the lower arm restricts motion of the extension arm as the extension arm pivots from being inclined toward the second cutting means toward a position substantially perpendicular to the first cutting means; a stop fixedly positioned on the first cutting means in the path of pivotal motion of the lower link; a rod having a first end pivotally attached to the second end of the extension arm and a second end pivotally attached to the second cutting means; and means for changing the angular position of the extension arm with respect to the first cutting means References Cited by the Examiner
UNITED STATES PATENTS

| | | | |
|---|---|---|---|
| 2,334,729 | 11/1943 | Sefcovic | 56—6 |
| 2,521,417 | 9/1950 | Sefcovic | 56—6 |
| 2,743,567 | 5/1956 | Martin | 56—6 |
| 2,753,674 | 7/1956 | Cunningham | 56—6 |
| 2,903,283 | 9/1959 | Sweetland | 287—61 |
| 2,905,491 | 9/1959 | Olson | 287—61 |
| 2,952,961 | 9/1960 | Engler | 56—25.4 |
| 2,982,080 | 5/1961 | Martin | 56—6 |
| 3,070,938 | 1/1963 | Winget | 56—6 |
| 3,085,385 | 4/1963 | Hansen et al. | 56—7 |
| 3,096,606 | 7/1963 | Weir | 56—26 |
| 3,103,090 | 9/1963 | Campbell | 56—6 |

FOREIGN PATENTS 213,772   3/1958   Australia.

ABRAHAM G. STONE, *Primary Examiner.*

ANTONIO F. GUIDA, RUSSELL R. KINSEY, T. GRAHAM CRAVER, *Examiners.*

R. J. BAYNHAM, M. C. PAYDEN,
*Assistant Examiners.*